US011639432B2

(12) United States Patent
Kobilka et al.

(10) Patent No.: US 11,639,432 B2
(45) Date of Patent: *May 2, 2023

(54) HYDROXYCINNAMIC ACID-DERIVED CROSSLINKING DIMERS

(71) Applicant: International Business Machines Corporation, Armonk, NY (US)

(72) Inventors: Brandon M. Kobilka, Fishkill, NY (US); Jason T. Wertz, Pleasant Valley, NY (US); Charles C. Sloop, III, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 201 days.

This patent is subject to a terminal disclaimer.

(21) Appl. No.: 17/148,255

(22) Filed: Jan. 13, 2021

(65) Prior Publication Data

US 2022/0220280 A1 Jul. 14, 2022

(51) Int. Cl.
*C08K 5/00* (2006.01)
*C08K 5/092* (2006.01)
*C08G 77/04* (2006.01)
*C08J 3/28* (2006.01)
*C08G 77/38* (2006.01)

(52) U.S. Cl.
CPC ............ *C08K 5/0025* (2013.01); *C08G 77/04* (2013.01); *C08G 77/38* (2013.01); *C08J 3/28* (2013.01); *C08K 5/092* (2013.01)

(58) Field of Classification Search
CPC ....... C08L 83/04; C08L 83/06; C09D 183/04; C09D 183/06; C09J 183/04; C09J 183/06; C08J 3/28
See application file for complete search history.

(56) References Cited

U.S. PATENT DOCUMENTS

| | | | |
|---|---|---|---|
| 4,562,278 A | 12/1985 | Hill | |
| 5,093,511 A | 3/1992 | Yoshida et al. | |
| 5,998,101 A | 12/1999 | Park et al. | |
| 8,304,031 B2 * | 11/2012 | Akiike | C09K 19/56 427/515 |
| 10,087,311 B2 | 10/2018 | Bayer et al. | |
| 10,233,289 B2 | 3/2019 | King et al. | |
| 10,233,290 B2 | 3/2019 | Czaplewski et al. | |
| 10,233,293 B2 | 3/2019 | Czaplewski et al. | |
| 10,246,543 B2 | 4/2019 | Huang et al. | |
| 2017/0121469 A1 | 5/2017 | Kobilka et al. | |
| 2018/0346653 A1 * | 12/2018 | Dussaud | C08G 77/20 |
| 2020/0325337 A1 | 10/2020 | Prasse et al. | |

FOREIGN PATENT DOCUMENTS

| | | |
|---|---|---|
| CN | 1091458 A | 8/1994 |
| CN | 1151411 A | 6/1997 |
| CN | 1194996 A | 10/1998 |
| CN | 109456488 A | 3/2019 |
| CN | 111094457 A | 5/2020 |
| EP | 0611786 A1 | 8/1994 |
| JP | 2020041072 A * | 3/2020 |

OTHER PUBLICATIONS

"Some Aspect of the Reactivity of Photo-dimerizable Esters Grafted onto Silicone Main Chain Polymers" authored by Coqueret et al. and published in Makromolekulare Chemie (1991) 192, 1517-1534.*
"Development of Functional Biointerfaces by Surface Modification of Polydimethylsiloxane with Bioactive Chlorogenic Acid" authored by Wu et al. and published in the journal Colloids and Surfaces B Biointerfaces (2014) 116, 700-706.*
International Search Report and Written Opinion, International Application No. PCT/IB2022/050137, dated Apr. 14, 2022, 9 pgs.
International Search Report and Written Opinion, International Application No. PCT/IB2022/050136, dated Apr. 14, 2022, 10 pgs.
Kobilka et al., "Hydroxycinnamic Acid-Derived Crosslinkers," U.S. Appl. No. 17/148,276, filed Jan. 13, 2021.
Caffeic Reduced Epoxy—only one, SciFinder Results, Printed: Jun. 7, 2019, 1 pages.
Caffeic Acid with Two Allyl Group Refs, SciFinder Results, Printed: Jun. 7, 2019, 13 pages.
Caffeic Acid Vinyl Structures, SciFinder Results, Printed: Jun. 7, 2019, 12 pages.
Caffeic Acid Ester with 3 Allyls Regs, SciFinder Results, Printed: Jun. 7, 2019, 7 pages.
Caffeic Acetates found, SciFinder Results, Printed: Jun. 7, 2019, 3 pages.
Caffeic—Thio from Allyl, SciFinder Results, Printed: Jun. 7, 2019, 1 page.
Caffeic—No Carboyl—Cyclobutane, SciFinder Results, Printed: Jun. 7, 2019, 3 pages.
Caffeic—Epoxy—8, SciFinder Results, Printed: Jun. 7, 2019, 2 pages.
Caffeic—Cyclobutane on with Groups on Same Sides, Printed: Jun. 7, 2019, 3 pages.
Habtemariam, S., "Molecular Pharmacology of Rosmarinic and Salvianolic Acids: Potential Seeds for Alzheimer's and Vascular Dementia Drugs," International Journal of Molecular Sciences, 2018, 19, 458, pp. 1-25. https://www.mdpi.com/1422-0067/19/2/458/htm.

(Continued)

*Primary Examiner* — Marc S Zimmer

(74) *Attorney, Agent, or Firm* — Kelsey M. Skodje

(57) ABSTRACT

A composition and article of manufacture comprising a crosslinked polymer and a method of crosslinking a polymer are disclosed. The crosslinked polymer includes a polysiloxane and at least two dimerizable hydroxycinnamic acid crosslinkers. The method includes obtaining a polysiloxane and at least two dimerizable hydroxycinnamic acid crosslinkers, reacting the polysiloxane and the crosslinkers to form a crosslinked polysiloxane, and dimerizing the at least two hydroxycinnamic acid crosslinkers.

16 Claims, 4 Drawing Sheets

(56) References Cited

OTHER PUBLICATIONS

Kim et al. "Fabrication of PDMS Microlenses with Various Curvatures Using a Water-Based Molding Method," Twelfth International Conference on Miniaturized Systems for Chemistry and Life Science, Oct. 2008, pp. 994-996.
Gelest, "Reactive Silicones: Forging New Polymer Links," Gelest, Inc., Functional Silicone Reactivity Guide, Printed: Nov. 22, 2019, 64 pages.
Holladay et al., "Biorenewable Processes to Acrylic Acid," Pacific Northwest National Laboratory, Printed: Nov. 22, 2019, 2 pages. http://iic.pnnl.gov/abstracts/nacs/o_109.pdf.
"About Us—GC Innovation America," Printed: Nov. 22, 2019, 7 pages. https://www.gcinnovationamerica.com/about-us/.
"Bio-Based Acrylic Acid Technology," SGA Polymers, Printed: Nov. 22, 2019, 1 page. http://www.sgapolymers.com/.
"Bio-based Route for Allyl Alcohols Beckons," Article, Jul. 20, 2009, 7 pages. htttps://www.chemicalprocessing.com/articles/2009/150/.
"Chemistry," Sekab, Printed: Nov. 22, 2019, 5 pages. https://www.sekab.com/en/products-services/chemistry/.
Naveau, H., "Infrared, NMR and mass spectra of the methacrylates or methacrylate-anhydride of five phenolic compounds," Spectrochimica Acta Part A: Molecular Spectroscopy, vol. 28, Issue 4, Apr. 1972, pp. 651-658 (Abstract Provided).
List of IBM Patents or Patent Applications Treated as Related, Dec. 17, 2020, 2 pages.
Nakagawa, et al., "Preparation and Research of Cured Resin from Biomass" Journal of Network Polymer, Japan, vol. 32, Issue 3, 2011, pp. 122-129 printed Jun. 9, 2020, 8 pages. (English abstract on p. 129) https://www.jstage.jst.go.jp/article/networkpolymer/32/3/32_122/_article/-char/en.

\* cited by examiner

HYDROXYCINNAMIC ACID-DERIVED CROSSLINKING DIMERS

BACKGROUND

The present disclosure relates to crosslinkers derived from hydroxycinnamic acids and, more specifically, to hydroxycinnamic acid-derived crosslinkers for polysiloxanes.

Polydimethylsiloxane (PDMS) is a polysiloxane polymer with the formula $CH_3[Si(CH_3)_2O]_nSi(CH_3)_3$, where n is an integer greater than 1. PDMS is used in a variety of applications. Examples of these applications can include medical devices, contact lenses, fabrication and prototyping of microfluidic devices, soft lithography processes, shampoos, caulking, anti-foaming agent, foods and cooking oils, etc. PDMS can have varying properties depending on factors such as the length of the monomer chain and the density of crosslinking throughout the polymer matrix. The type of crosslinking is determined, at least in part, by the molecules used as crosslinkers. By varying the functional groups and structures of organic crosslinkers, PDMS materials having numerous properties can be produced.

SUMMARY

Various embodiments are directed to a composition that includes a crosslinked polymer. The crosslinked polymer includes a polysiloxane (e.g., polydimethylsiloxane) and at least two dimerizable hydroxycinnamic acid crosslinkers. The crosslinkers can have structures such as

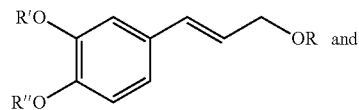

and

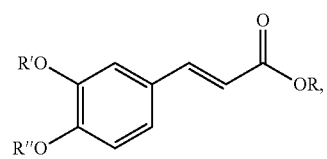

where —OR, —OR', and —OR" are substituents that can participate in crosslinking reactions with the polysiloxane. In some embodiments, R, R', and R" can each be a hydrogen atom, an acyl group, an acryloyl group, an allyl group, or a propanethiol group. The dimerizable hydroxycinnamic acid crosslinkers can be hydroxycinnamic acids, alcohols derived from hydroxycinnamic acids, and functionalized hydroxycinnamic acid derivatives. The polysiloxane can be crosslinked with a dimerized crosslinker having the following structure:

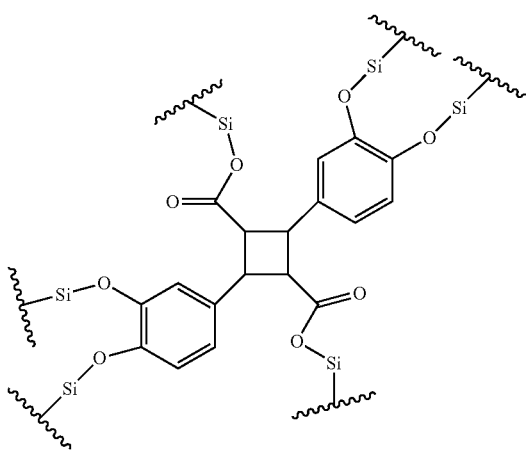

Additional embodiments are directed to a method of forming a crosslinked polymer. The method includes obtaining a polysiloxane (e.g., polydimethylsiloxane) and at least two dimerizable hydroxycinnamic acid crosslinkers, reacting the polysiloxane and the crosslinkers to form a crosslinked polysiloxane, and dimerizing the at least two hydroxycinnamic acid crosslinkers. The dimerizing can include reacting the dimerizable hydroxycinnamic acid crosslinkers with light at wavelengths at or below about 260 nm. The dimerizable hydroxycinnamic acid crosslinkers can be derived from a hydroxycinnamic acid such as coumaric acid, sinapic acid, ferulic acid, caffeic acid, fertaric acid, coutaric acid, caftaric acid, cichoric acid, chlorogenic acid, and diferulic acid. The hydroxycinnamic acid can be obtained from a biobased source. The polysiloxane can have at least two repeat units with a functional group (e.g., a vinyl group, a methoxy group, a hydrogen atom, a hydroxyl group, or an alkyl group) that can participate in a crosslinking reaction (e.g., a thiol-ene reaction, a condensation reaction, or an addition reaction) with the at least two dimerizable hydroxycinnamic acid crosslinkers.

Further embodiments are directed to an article of manufacture that includes a crosslinked polymer. The crosslinked polymer includes a polysiloxane and at least two dimerizable hydroxycinnamic acid crosslinkers. The crosslinkers can have structures such as

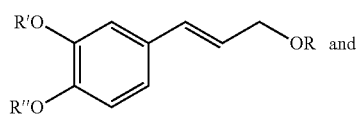

and

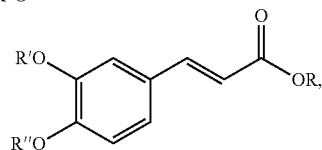

where —OR, —OR', and —OR" are substituents that can participate in crosslinking reactions with the polysiloxane. In some embodiments, R, R', and R" can each be a hydrogen atom, an acyl group, an acryloyl group, an allyl group, or a propanethiol group. The polysiloxane can be crosslinked with the at least two hydroxycinnamic acid crosslinkers. Dimerization of the crosslinked crosslinkers can form a dimerized crosslinker having the following structure:

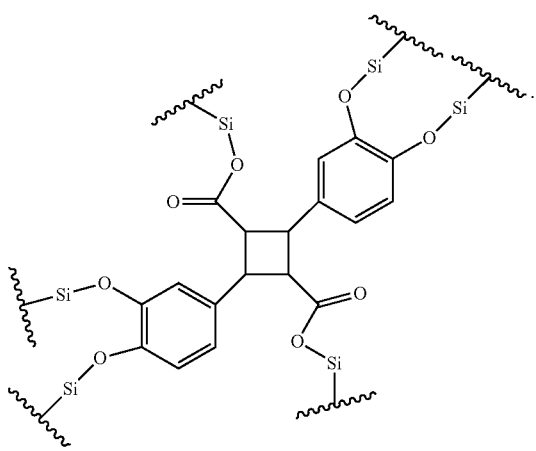

DETAILED DESCRIPTION

Polysiloxanes, such as polydimethylsiloxane (PDMS), are widely used types of silicon-based polymers. Examples of PDMS applications can include medical devices, contact lenses, microfluidic and microelectromechanical systems, soft lithography processes, shampoos, caulking, lubricants, foods and cooking oils, etc. PDMS is viscoelastic material, and has tunable properties such as mechanical properties (e.g., viscosity, shear modulus, elasticity, etc.) and chemical properties (e.g., surface chemistry, functionalization, etc.) depending on factors such as the number (n) of [SiO(CH$_3$)$_2$]$_n$ repeat units, presence and number of functionalized repeat units, and degree of crosslinking throughout the polymer matrix. The type of crosslinking is determined, at least in part, by the molecules used as crosslinkers. By varying the functional groups and structures of organic crosslinkers, PDMS materials having numerous properties can be produced.

However, the organic crosslinkers used with PDMS are typically derived from petrochemical sources. Due to the rising costs of fossil fuels and increasing environmental regulatory controls, it can be advantageous to replace traditional petrochemical crosslinkers with crosslinkers from sustainable sources, such as biomass. Advances in biotechnology have provided numerous strategies for efficiently and inexpensively producing bio-based compounds on an industrial scale. Examples of these strategies can be found in fermentation technologies, membrane technologies, and genetic engineering. Biotechnological strategies can include plant-based and microorganism-based approaches. Plant-based approaches can involve obtaining a material directly from a plant, or growing plant tissues or cells that can produce bio-based compounds from various substrates using their own biosynthetic pathways. Microorganism-based approaches involve using native or genetically modified fungi, yeast, or bacteria to produce a desired compound from a structurally similar substrate.

Disclosed herein are techniques for forming crosslinkers derived from hydroxycinnamic acids. The hydroxycinnamic acids are functionalized with various moieties in order to produce the crosslinkers. In some embodiments, the functionalization reactions employ additional biobased compounds as sources of the added moieties. The crosslinkers can be reacted with hydroxy- or methoxy-functionalized PDMS to form a variety of crosslinked PDMS polymers. In some embodiments, the disclosed crosslinkers can also be used with polymers other than PDMS (e.g., other hydroxy- or methoxy-functionalized polymers). Hydroxycinnamic acids and hydroxycinnamates are hydroxy derivatives of cinnamic acid ((2E)-3-phenylprop-2-enoic acid), which is an intermediate in a number of biosynthetic processes. Cinnamic acid can also be obtained from natural products such as oil of cinnamon, balsams (e.g., storax), aloe, and shea butter. Cinnamic acid has the following structure:

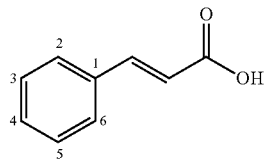 [SMILES: O=C(O)/C=C/c1ccccc1]

Figure 2:
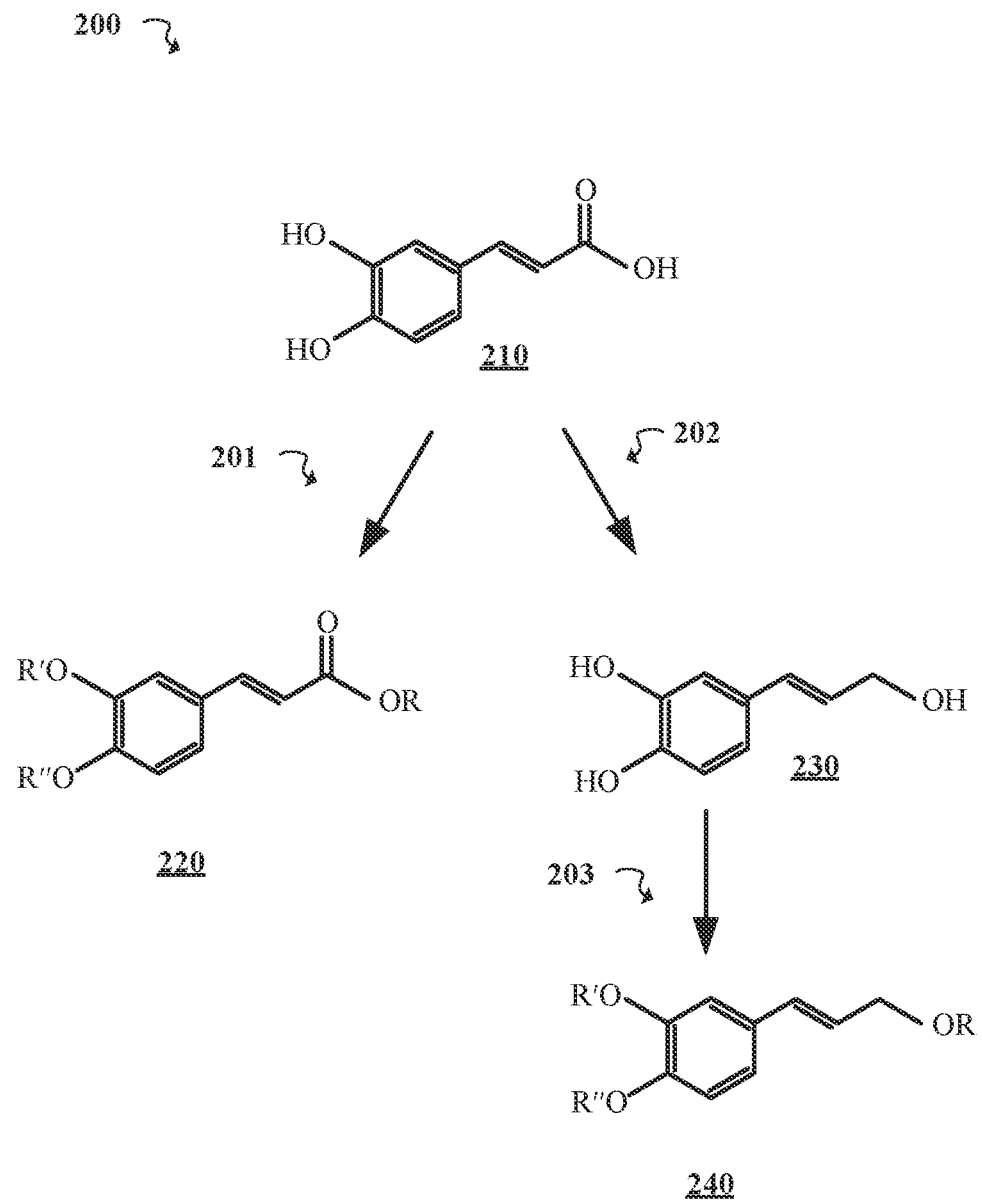
FIG. 2 is a chemical reaction diagram illustrating processes of forming hydroxycinnamic acid crosslinkers, according to some embodiments of the present disclosure.

For illustrative purposes, the phenyl carbon atom positions are numbered 1-6. Most hydroxycinnamic acids have a hydroxyl group bound to carbon at phenyl position 3 (e.g., coumaric acid, sinapinic acid, and ferulic acid) or positions 3 and 4 (e.g., caffeic acid, fertaric acid, coutaric acid, caftaric acid, cichoric acid, and chlorogenic acid). Additionally, some hydroxycinnamic acids (e.g., caftaric acid, coutaric acid, fertaric acid, and chlorogenic acid, diferulic acids, α-cyano-4-hydroxycinnamic acid, etc.) can have hydroxyl groups and/or other functionalities bound to the phenyl ring and/or substituents on the ring. An example structure of a hydroxycinnamic acid, caffeic acid, is illustrated in FIG. 2. Herein, "hydroxycinnamic acid" refers to any hydroxycinnamic acid unless stated otherwise.

Figure 1:
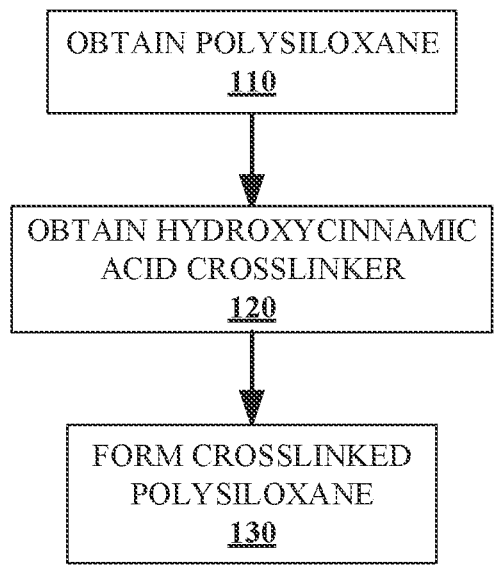
FIG. 1 is a flow diagram illustrating a process of forming a crosslinked polysiloxane, according to some embodiments of the present disclosure.

FIG. 1 is a flow diagram illustrating a process 100 of forming a crosslinked polysiloxane, according to some embodiments of the present disclosure. A polysiloxane is obtained. This is illustrated at step 110. In some embodiments, the polysiloxane is obtained as monomers for forming the polysiloxane (e.g., in the presence of crosslinkers). However, the polymerized polysiloxane can be obtained at step 110. In subsequent steps, the polymer can be crosslinked (e.g., during blending, curing, or other processing). This is discussed in greater detail with respect to FIG. 3. In some embodiments, the polysiloxane is PDMS. However, other polysiloxanes, such as polymethylhydrosiloxane (PMHS) or polymethylmethoxysiloxane (PMS), can be used as well At least one hydroxycinnamic acid crosslinker is obtained. This is illustrated at step 120. Hydroxycinnamic acid crosslinkers can be hydroxycinnamic acids, alcohols obtained by reducing hydroxycinnamic acids, and/or functionalized compounds derived from hydroxycinnamic acids. The hydroxycinnamic acids can be isolated from a variety of biological sources. For example, caffeic acid can be obtained from hawthorn, burdock, artichokes, pears, basil, thyme, apples, and oregano. Sinapinic acid, caftaric acid, coutaric acid, and fertaric acid can be obtained from wine and grapes. Ferulic acid can be obtained from flax, bran, legumes, oats, rice, artichokes, oranges, pineapples, apples, and peanuts. Chlorogenic acid can be obtained from echinacea, strawberries, pineapples, coffee, sunflowers, and blueberries. However, hydroxycinnamic acids can be obtained from any appropriate source (e.g., vinegar and additional plant sources) or synthetic technique (e.g., hydroxylation of cinnamic acid or saponification of hydroxycinnamates).

Functionalization of the hydroxycinnamic acids can be carried out via reactions involving the hydroxyl groups and/or carboxylic acid groups on the hydroxycinnamic acid. The functional groups are selected based on their ability to bind at selected reactive sites on a polysiloxane chain. Binding to a polysiloxane chain is discussed in greater detail with respect to FIG. 3. Examples of functional groups that can be attached at phenyl positions 1, 3, 4 of the hydroxycinnamic acid can include acyls, thiols (e.g., via ether or ester linkages), acetates, vinyl acetates, vinyl ethers, etc. In some embodiments, the carboxylic acid group(s) on the hydroxycinnamic acid are reduced to hydroxyls before attachment of new functional groups to form the crosslinkers. Sources of the functional groups can include a variety of organic compounds (e.g., allyl alcohol, acrylic acid, acetic acid, 3-mercaptopropionic acid, etc.). In some embodiments, the organic compounds are derived from biomass or other bio-based sources. This is discussed in greater detail with respect to FIG. 2.

A crosslinked polysiloxane is formed. This is illustrated at step 130. The polysiloxane can optionally contain additional components such as bound or unbound additives (e.g., reactive and/or additive flame retardants, fillers, chain extenders, other crosslinkers, pigments, dyes, blowing agents, nano- and/or microcapsules, nano- and/or microparticles, etc.). A variety of techniques can be used to form the crosslinked polysiloxane. For example, vinyl functionalized crosslinkers can be applied to a polysiloxane via addition and peroxide cure reactions, which use platinum and peroxide catalysts, respectively. Hydroxycinnamic acid crosslinkers having at least two hydroxyl groups, as well as acetate functionalized hydroxycinnamic acid crosslinkers, can be applied to the polysiloxane via condensation cure reactions. Thiol-functionalized crosslinkers can be applied to the polysiloxane in thiol-ene cure reactions.

In some embodiments, the curing reactions are carried out during processing of the polysiloxane, resulting in the crosslinked polysiloxane. In other embodiments, the crosslinkers can be mixed with the polysiloxane to form a partially crosslinked or uncrosslinked polysiloxane. The curing can then be carried out in response to a subsequent action. For example, polysiloxane-based caulking and coatings can be cured once applied to a surface. In some embodiments, curing requires or is aided by application of heat. Curing reactions are discussed in greater detail with respect to FIG. 3. In some embodiments, the crosslinking at step 130 can include dimerization of the hydroxycinnamic acid crosslinkers. This is discussed in greater detail with respect to FIG. 4.

FIG. 2 is a chemical reaction diagram 200 illustrating processes 201, 202, and 203 of forming hydroxycinnamic acid crosslinkers, according to some embodiments of the present disclosure. For simplicity, caffeic acid 210 is the only hydroxycinnamic acid illustrated in FIG. 2. However, processes 201, 202, and 203 can be carried out with other hydroxycinnamic acids, resulting in analogous derivatives. Examples of hydroxycinnamic acids that can be used are discussed in greater detail with respect to FIG. 1.

In process 201, caffeic acid 210 is reacted to form a caffeic acid-derived crosslinker 220 ("caffeic acid crosslinker 220". The illustrated caffeic acid crosslinker 220 has substituents at phenyl positions 1, 3, and 4, which include, respectively, functional groups referred to as R, R', and R". Each functional group can bind to an appropriate functional group on PDMS (see FIG. 3). Therefore, each molecule of the caffeic acid crosslinker 220 may bind to PDMS at three positions on the PDMS chain. In other embodiments, a substituent on the caffeic acid crosslinker 220 does not have a functional group that can form a bond with a functional group on the PDMS chain. In these instances, the caffeic acid crosslinker 220 can instead bind at two positions on the PDMS chain. Further, caffeic acid crosslinkers 220 having at least one substituent with more than one functional group can be formed. These caffeic acid crosslinkers 220 may bind to PDMS at more than three positions. Similar crosslinkers formed from hydroxycinnamic acids with additional functional groups (e.g., caftaric acid, coutaric acid, fertaric acid, ferulic acid, chlorogenic acid, cichoric acid, etc.) may also form more than two bonds.

In some embodiments, process 201 is a reaction between caffeic acid 210 and acetic acid or an acetate (e.g., methyl acetate). The acetic acid or acetate can be obtained from any source. In some embodiments, acetic acid and/or methyl acetate are derived from biomass. For example, acetic acid can be produced through bacterial fermentation. Methyl acetate can be produced by esterification of acetic acid in the presence of a strong acid (e.g., sulfuric acid). In other embodiments, the acetic acid and/or acetate are produced via conventional synthetic techniques. Further, acetic acid and acetates may be obtained from commercial sources.

When process 201 is a reaction between caffeic acid and acetic acid or methyl acetate, the caffeic acid crosslinker 220 can have a structure where R is a hydrogen atom and R' and R" are acyl radicals. That is, this crosslinker ("crosslinker A") can include the carboxylic acid group at phenyl position 1 and acetate groups at phenyl positions 3 and 4. The carboxylic acid group at position 1 can be reacted further to form a substituent with a terminal acetate group. For example, crosslinker A can be reacted with potassium carbonate ($K_2CO_3$) and 3-bromopropyl acetate in a mixture of acetone and dimethylsulfoxide (DMSO) to form an acetate-functionalized crosslinker ("crosslinker B") having the following structure:

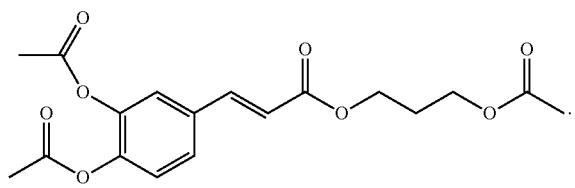 [SMILES: CC(=O)OCCCOC(=O)/C=C/c1ccc(OC(C)=O)c(OC(C)=O)c1]

Process 201 can also be a reaction between caffeic acid 210 and allyl bromide (3-bromo-1-propene), resulting in a crosslinker 220 having allyl functional groups. For example, caffeic acid 210 can be reacted with allyl bromide and $K_2CO_3$ in an acetone/DMSO mixture, resulting in a crosslinker ("crosslinker C"), where R, R', and R" are allyl groups (—CH₂CH=CH₂), which contain vinyl groups (—CH₂=CH₂). In some embodiments, the allyl bromide is derived from biobased allyl alcohol (prop-2-en-1-ol). For example, allyl alcohol can be produced by deoxygenating glycerol obtained as a biodiesel byproduct. The deoxygenation reaction can include treatment of glycerol with formic acid at about 230° C.-240° C. However, allyl alcohol can also be obtained via other techniques, such as hydrolysis of allyl chloride or allyl iodide. Conversion of allyl alcohol to allyl bromide can be carried out using techniques known to persons of ordinary skill in the art (e.g., via reaction of allyl alcohol and hydrobromic acid in the presence of sulfuric acid).

Process 201 can be a reaction between caffeic acid 210 and acrylic acid. The acrylic acid can be obtained from any source. In some embodiments, the acrylic acid is derived from biomass. For example, biobased glucose can be fermented to form lactic acid. The lactic acid can then be reacted in an acid-catalyzed reaction to form acrylic acid. This acid-catalyzed reaction can take place in an azeotropic solvent, such as acetic acid, at a temperature and pressure of approximately 70° C. and approximately 2×10⁴ Pa, respectively.

When process 201 is the reaction between caffeic acid 210 and acrylic acid, the caffeic acid crosslinker 220 can have a structure in which R is a hydrogen atom and R' and R" are acryloyl (prop-2-enoyl) moieties. That is, this crosslinker ("crosslinker D") can include the carboxylic acid substituent at phenyl position 1 and acrylates at positions 3 and 4. The carboxylic acid group can be reacted further to form an ester-linked substituent where R is an allyl group. For example, crosslinker D can be reacted with K₂CO₃ and allyl bromide in an acetone/DMSO mixture to form a vinyl-functionalized crosslinker ("crosslinker E") having the following structure:

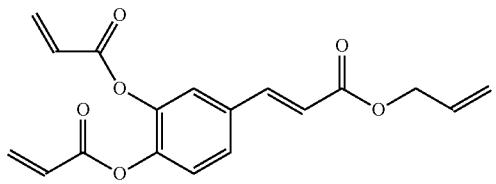 [SMILES: C=CCOC(=O)/C=C/c1ccc(OC(=O)C=C)c(OC(=O)C=C)c1]

In further embodiments, caffeic acid 210 can be reacted with 3-bromopropyl thiolacetate (CH₃C(=O)S(CH₂)₃Br) and K₂CO₃ in a mixture of acetone and DMSO, followed by refluxing in a hydrochloric (HCl) acid/ethanol (EtOH) mixture. This reaction can produce a caffeic acid crosslinker 220 having a structure where R, R', and R" are each propanethiol groups (—CH₃(CH₂)₂SH). That is, this crosslinker ("crosslinker F") has an ester-linked thiol substituent at phenyl position 1 and ether-linked thiol substituents at phenyl positions 3 and 4.

A caffeic acid crosslinker 220 with ester-linked thiol substituents at phenyl positions 1, 3, and 4 can be produced as well. For example, caffeic acid 210 can be reacted with 3-mercaptopropionic acid to produce a caffeic acid crosslinker 220 having a structure with a carboxylic acid group at phenyl position 1 and ester-linked thiol substituents at phenyl positions 3 and 4. This carboxylic acid- and thiol-functionalized crosslinker ("crosslinker G") can be reacted with 3-bromopropyl thioacetate and K₂CO₃ in an acetone/DMSO mixture, followed by refluxing in an HCl/EtOH mixture to produce a thiol-functionalized crosslinker ("crosslinker H") with the following structure:

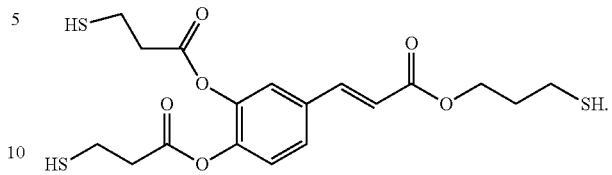

Referring now to processes 202, the caffeic acid 210 carboxylate group is reduced to form an alcohol (caffeyl alcohol 230). The reduction reaction can be carried out using any appropriate techniques for reducing a carboxylic acid moiety to form a hydroxyl group. For example, caffeic acid 210 can be reacted with lithium aluminum hydride (LiAlH₄), followed by protonation, to form the hydroxyl group. Additional techniques for carboxylic acid reduction are known to those of ordinary skill in the art. Reduction of other hydroxycinnamic acids results in analogous alcohols. For example, ferulic acid can be reduced to coniferyl alcohol (4-hydroxy-3-methoxycinnamyl alcohol), and sinapic acid can be reduced to sinapyl alcohol (4-hydroxy-3,5-dimethoxycinnamyl alcohol).

In process 203, caffeyl alcohol 230 can be reacted further to produce a caffeyl alcohol crosslinker 240 with functional groups R, R, and R". Reactions substantially the same as those used to modify the hydroxyl groups at positions 3 and 4 in process 201 can be carried out with caffeyl alcohol 230 to bind functional groups R, R', and R" to substituents at phenyl positions 1, 3, and 4, respectively. Therefore, the caffeyl alcohol crosslinker 240 formed in process 203 can have ether-linked moieties (e.g., allyl, acyl, propanethiol, acryloyl, thiol etc.) for each of R, R', and R". In one example, caffeyl alcohol 230 can be reacted with methyl acetate to produce a caffeyl alcohol crosslinker 240 where R, R', and R are acyl groups. Additional reactions that can be carried out to form hydroxycinnamic acid crosslinkers derived from caffeyl alcohol 230 are discussed in greater detail above with respect to process 201.

Figure 3:
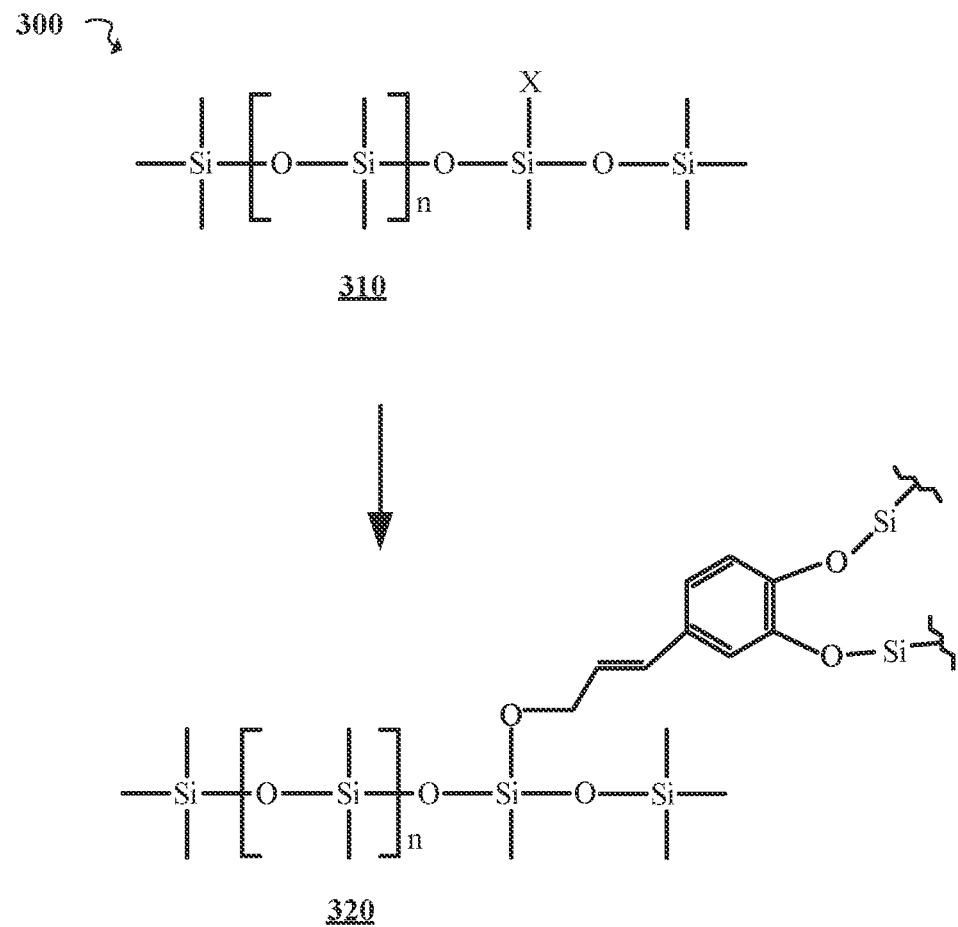
FIG. 3 is a chemical reaction diagram illustrating a process of crosslinking PDMS via a reaction with a hydroxycinnamic acid crosslinker, according to some embodiments of the present disclosure.
Figure 4:
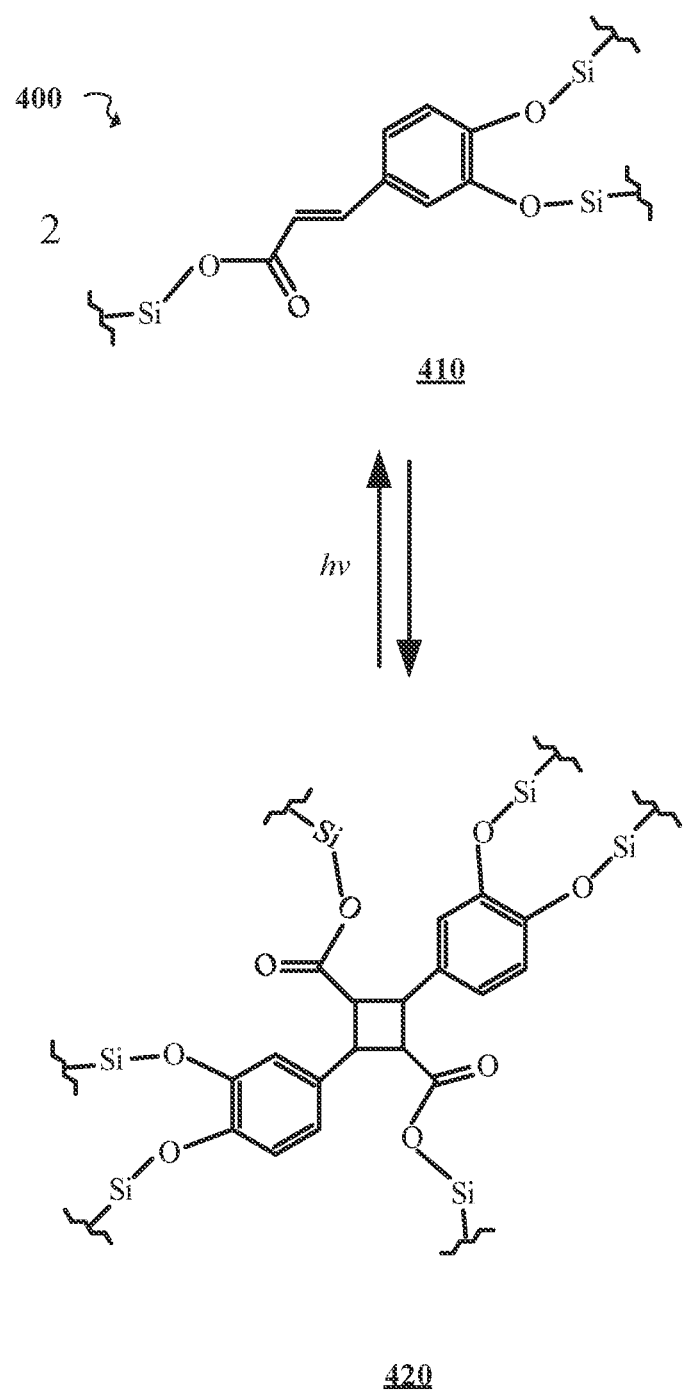
FIG. 4 is a chemical reaction diagram illustrating a process of crosslinking PDMS with a dimerizable crosslinker, according to some embodiments of the present disclosure.

FIG. 3 is a chemical reaction diagram illustrating a process 300 of crosslinking PDMS 310 via a reaction with a hydroxycinnamic acid crosslinker (e.g., 210, 220, 230, and/or 240 of FIG. 2), according to some embodiments of the present disclosure. The illustrated crosslinker is a caffeyl alcohol crosslinker 240. However, any appropriate hydroxycinnamic acid crosslinker can be used. For example, caffeic acid crosslinkers 220 formed in process 201, alcohols (e.g., caffeyl alcohol 230), and hydroxycinnamic acids (e.g., caffeic acid 210) can be added to PDMS 310 in process 300 as well. In these instances, the hydroxycinnamic acid crosslinkers will have ester linkages to the PDMS 310 at phenyl position 1. An example of this is illustrated in FIG. 4.

PDMS 310 is illustrated with a number (n) of dimethyl repeat units, where n can be an integer between 1 and 1,000,000 (e.g., about 1-25,000, about 500-25,000, about 1,000-25,000, about 2,000-25,000, about 5,000-25,000, about 25,000-50,000, about 50,000-500,000, etc.), and one functionalized repeat unit, where X can represent a functional group other than methyl. However, this is for simplicity, and it should be understood that crosslinking occurs when a crosslinker binds to more than one functionalized repeat unit on the PDMS 310. PDMS 310 properties can be tuned by varying the number and positions of functionalized repeat units, as will be understood by persons of ordinary skill in the art. In some embodiments, at least one of the functionalized repeat units can have a different X functional group that another repeat unit. For example, a molecule of PDMS 310 can have at least one repeat unit where X is a methoxy group and at least one repeat unit where X is a hydroxyl group.

In process 300, hydroxycinnamic acid crosslinkers (e.g., 210, 220, 230, 240, etc.) are added to PDMS 310 to form the crosslinked PDMS 320. The crosslinked PDMS 320 includes a bond to a crosslinker at the position of the functionalized repeat unit on PDMS 310. The additional crosslinking bonds are illustrated at additional functionalized repeat units represented by wavy lines in FIG. 3. Various techniques can be used to form the crosslinked PDMS 320 in process 300.

For example, vinyl-functionalized crosslinkers can be used to crosslink unsubstituted PDMS 310 and PDMS 310 where X is another alkyl group (e.g., ethyl, propyl, isopropyl, etc.) via addition/peroxide cure reactions. Examples of vinyl-functionalized crosslinkers that can participate in the addition/peroxide cure reactions can include crosslinkers C, D, and E, analogous vinyl-functionalized crosslinkers derived from hydroxycinnamic acids other than caffeic acid 210, and analogous crosslinkers derived from caffeyl alcohol 230 or other reduced hydroxycinnamic acid derivatives (e.g., coniferyl alcohol, sinapyl alcohol, etc.). The addition/peroxide cure reactions in process 300 can be carried out with platinum catalysts (e.g., Karstedt's catalyst), peroxide initiators (e.g., di-tert-butyl peroxide, benzoyl peroxide, methyl ethyl ketone peroxide (MEKP), peroxydisulfate salts, etc.), etc.

In other examples, PDMS 310 can be crosslinked in a condensation cure reaction. In some embodiments, these condensation reactions can be catalyzed by dibutyltin dilaurate (DBTDL). Acetate-functionalized crosslinkers (e.g., crosslinkers A or B and analogous acetate-functionalized crosslinkers derived from reduced compounds such as caffeyl alcohol 230, coniferyl alcohol, sinapyl alcohol, etc.) can be used in a condensation cure with PDMS 310 where X is a hydroxyl group. Condensation cures can also be carried out with hydroxyl-functionalized crosslinkers and PDMS 310 where X is a hydrogen atom or a methoxy group. Hydroxyl-functionalized crosslinkers that can be used can include caffeyl alcohol 230, coniferyl alcohol, sinapyl alcohol, and other alcohols derived from hydroxycinnamic acids. In some embodiments, hydroxycinnamic acids with more than one hydroxyl group, such as cichoric acid, can be used as well.

Thiol-ene cure reactions can also be used in process 300. Thiol-ene reactions can be used to crosslink polymers having alkene groups with thiol-functionalized crosslinkers. For example, process 300 can include PDMS 310, where X is a vinyl group, a substituent containing a vinyl group (e.g., allyl), or another alkene substituent, and thiol-functionalized crosslinkers (e.g., crosslinker F, G, and H). In some embodiments, the thiol-ene reactions occur via free-radical addition. Free-radical addition reactions can be initiated by application of light (e.g., ~250 nm-300 nm), heat (e.g., heated air or infrared radiation), or radical initiators (e.g., halogens, peroxides, azo compounds, etc.). In other embodiments, the thiol-ene reactions occur via Michael addition. Michael addition reactions can be catalyzed by primary or tertiary amine catalysts, phosphine catalysts, etc.

FIG. 4 is a chemical reaction diagram illustrating a process 400 of crosslinking PDMS with a dimerizable crosslinker, according to some embodiments of the present disclosure. Examples of reactions that can be used to crosslink PDMS with the dimerizable crosslinker 410 are discussed in greater detail with respect to FIG. 3. The crosslinking bonds of the dimerizable crosslinker 410 are illustrated at binding sites on functionalized repeat units represented by wavy lines. The illustrated dimerizable crosslinker 410 has an ester linking group at phenyl position 1, and can be a functionalized hydroxycinnamic acid crosslinker (e.g., caffeic acid crosslinker 220 or 240). However, the dimerizable crosslinker 410 can also be a hydroxycinnamic acid (e.g., caffeic acid 210), an alcohol (e.g., caffeyl alcohol 230), or an alcohol-derived crosslinker (e.g., a caffeyl alcohol crosslinker 240). Compounds 210, 220, 230, and 240 are illustrated in FIG. 2. When an alcohol or alcohol-derived crosslinker is used, the dimerizable crosslinker 410 will include an ether linking group at phenyl position 1.

In process 400, dimerization of the dimerizable crosslinker 410 is introduced by application of light (hv) to crosslinked PDMS matrix. Application of ultraviolet (UV), such as light at or below approximately 260 nm (e.g., ~100 nm-260 nm) causes a dimerization reaction between two molecules of the dimerizable crosslinker 410, resulting in a dimerized crosslinker 420. In some embodiments, the dimerization reaction can be carried out at wavelengths of light below approximately 300 nm. The dimerization reaction can be reversed in the presence of light with wavelengths at or above approximately 300 nm-315 nm (e.g., ~300-700 nm, ~400-800 nm, etc.).

In addition to the compounds and reactions discussed with regard to FIGS. 2, 3, and 4, hydroxycinnamic acids and crosslinked polysiloxanes can be formed using numerous additional functional groups and/or polymerization, processing, and curing techniques. For example, crosslinkers can be formed with R, R', and/or R" moieties including functional groups such as epoxides, propylene carbonate, alkyl halides, esters, alkynes, amines, isocyanates, acid chlorides, chloroformates, etc. Additional polysiloxane functional groups and crosslinking techniques that can be used with the hydroxycinnamic acid crosslinker functional groups are known to persons of ordinary skill in the art.

R, R', and/or R" can also include moieties such as substituted or unsubstituted alkyl groups. Herein, "alkyl" refers to $C_1$-$C_{100}$ radicals, which can be linear, branched, or cyclic. Examples of alkyl groups can include methyl, ethyl, n-propyl, iso-propyl, n-butyl, iso-butyl, sec-butyl, tert-butyl, pentyl, hexyl, octyl, cyclopropyl, cyclobutyl, cyclopentyl, cyclohexyl, cyclooctyl. In some embodiments, the alkyls are unsaturated (e.g., alkenes and alkynes).

In some embodiments, R, R', and/or R" can also include moieties such as cyclic alkyl groups and substituted analogues of cyclic alkyl group. When cyclic, the alkyl groups can be aromatic or non-aromatic. Herein, the term "aromatic" also refers to pseudoaromatic heterocycles, which are heterocyclic substituents that have similar properties and structures (nearly planar) to aromatic heterocyclic ligands, but are not by definition aromatic. Examples of cyclic aromatic alkyls that can be used can include six-carbon aromatic rings (phenyl) and substituted variants thereof (e.g. 2-methyl-phenyl, xylyl, tolyl, etc.), $C_4$-$C_{60}$ aromatic rings, $C_4$-$C_{20}$ aromatic rings, etc. The cyclic groups can optionally include heteroatoms (e.g., nitrogen, oxygen, or sulfur) replacing at least one carbon atom in the cyclic structure.

The compounds described herein can contain one or more chiral centers. Unless otherwise noted, the disclosed structures cover all stereoisomers, conformers, rotamers, isomers, and enantiomers of the represented compounds. Further, polymers or other materials containing the disclosed compounds can include racemic forms of the compounds in addition to individual stereoisomers, as well as mixtures containing any of these. Substituents on the compounds described herein may participate in additional chemical reactions, transformations, or interactions, which can include synthesis, decomposition, single and/or double replacement, oxidation/reduction, acid/base, nucleophilic, electrophilic and radical substitutions, addition/elimination reactions, and polymerization reactions.

Where isomers of a named alkyl, alkenyl, alkoxy, aryl, or other functional group exist (e.g., n-butyl, iso-butyl, sec-butyl, and tert-butyl), reference to a member of the group without specifying a particular isomer (e.g., butyl) is intended to include all isomers in the family (e.g., n-butyl, iso-butyl, sec-butyl, and tert-butyl). Further, unless specified otherwise, reference to one member of the group (e.g., n-butyl) includes the remaining isomers in the family (e.g., iso-butyl, sec-butyl, and tert-butyl).

Unless otherwise noted, chemical reactions are performed at ambient conditions or under slight heating with no special atmosphere or head space, and may be performed using standard organic solvents to manage mix properties such as viscosity and flow index. Standard procedures for quenching reactions, solvent removal, and purification are performed. Room temperature is between about 15° C. and 25° C. unless otherwise indicated. Ranges (e.g., time, concentration, temperature, etc.) indicated herein include both endpoints and all numbers between the endpoints. Unless specified otherwise, the use of "about," "approximately," or a tilde (~) in connection with a range applies to both ends of the range (e.g., "approximately 1 g-5 g" should be interpreted as "approximately 1 g-approximately 5 g"). Unless otherwise indicated, modifying terms such as "about," "approximately," and "~" indicate +/−10% of a recited value, range of values, or endpoints of one or more ranges of values.

The processes discussed herein, and their accompanying drawings, are not to be construed as limiting. One skilled in the art would recognize that a variety of techniques may be used that vary in conditions, components, methods, etc., which ultimately generate hydroxycinnamic acid crosslinkers and crosslinked polysiloxanes. In addition, the conditions can optionally be changed over the course of a process. Further, in some embodiments processes can be added, omitted, or carried out in alternate orders, while still remaining within the scope of the disclosure, as will be understood by a person of ordinary skill in the art. It should also be noted that processes can be carried out by a single entity, or by multiple entities. For example, a first entity may form the hydroxycinnamic acid crosslinkers, and a second entity may carry out the crosslinking of the polysiloxane.

What is claimed is:

1. A composition comprising a crosslinked polymer, the crosslinked polymer derived from materials comprising:
   a polysiloxane, and
   dimerizable hydroxycinnamic acid-derived crosslinkers.

2. The composition of claim 1, wherein the dimerizable hydroxycinnamic acid-derived crosslinkers have the following structure:

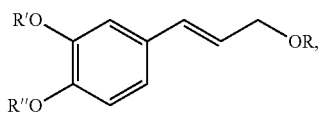

where —OR, —OR', and —OR" are substituents that can participate in crosslinking reactions with the polysiloxane and wherein R, R', and R" are each selected from the group consisting of a hydrogen atom, an acyl group, an acryloyl group, an ally group, and a propanethiol group.

3. The composition of claim 1, wherein the dimerizable hydroxycinnamic acid-derived crosslinkers are selected from the group consisting of hydroxycinnamic acids, alcohols derived from reacting hydroxycinnamic acids with a reducing agent, and functionalized hydroxycinnamic acid derivatives.

4. The composition of claim 1, wherein, upon dimerization of the dimerizable hydroxycinnamic acid-derived crosslinkers, the crosslinked polymer has the following structure:

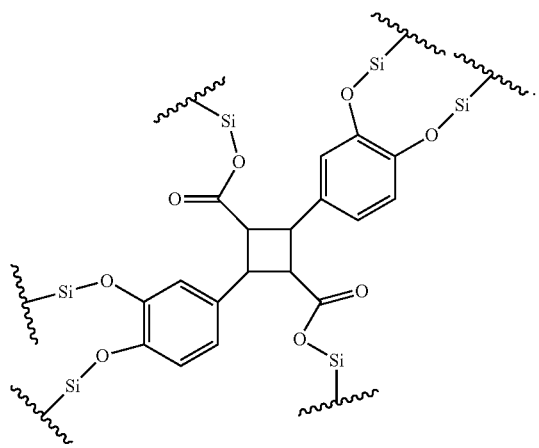

5. The composition of claim 1, wherein the dimerizable hydroxycinnamic acid-derived crosslinkers have the following structure:

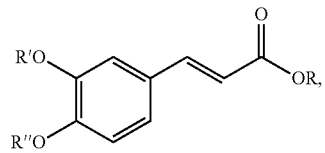

where —OR, —OR', and —OR" are substituents that can participate in crosslinking reactions with the polysiloxane and wherein R, R', and R" are each selected from the group consisting of a hydrogen atom, an acyl group, an allyl group, an acryloyl group, and a propanethiol group.

6. A method of forming a crosslinked polymer, comprising:
   obtaining a polysiloxane;
   obtaining dimerizable hydroxycinnamic acid-derived crosslinkers;
   reacting the polysiloxane and the dimerizable hydroxycinnamic acid-derived crosslinkers to form a crosslinked polysiloxane; and
   dimerizing the dimerizable hydroxycinnamic acid-derived crosslinkers.

7. The method of claim 6, wherein the dimerizing includes reacting the dimerizable hydroxycinnamic acid-derived crosslinkers with light at wavelengths at or below approximately 260 nm.

8. The method of claim 6, wherein the dimerizable hydroxycinnamic acid-derived crosslinkers are selected from the group consisting of coumaric acid, sinapic acid, ferulic acid, caffeic acid, fertaric acid, coutaric acid, caftaric acid, cichoric add, chlorogenic acid, diferulic acid, and derivatives thereof.

9. The method of claim 6, wherein the dimerizable hydroxycinnamic acid-derived crosslinkers are obtained from a biobased source.

10. The method of claim 6, wherein the polysiloxane has at least two repeat units with functional groups that can participate in a crosslinking reaction with the dimerizable hydroxycinnamic acid-derived crosslinkers.

11. The method of claim 10, wherein the functional groups are selected from the group consisting of a vinyl group, a methoxy group, a hydrogen atom, a hydroxyl group, and an alkyl group.

12. The method of claim 6, wherein the reacting the polysiloxane and the dimerizable hydroxycinnamic acid-derived crosslinkers includes a reaction selected from the group consisting of a thiol-ene reaction, a condensation reaction, and an addition reaction.

13. An article of manufacture comprising a crosslinked polymer, the crosslinked polymer derived from materials comprising:
a polysiloxane, and
dimerizable hydroxycinnamic acid-derived crosslinkers.

14. The article of manufacture of claim 13, wherein the dimerizable hydroxycinnamic acid-derived crosslinkers have the following structure:

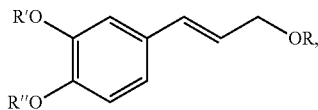

where —OR, —OR', and —OR" are substituents that can participate in crosslinking reactions with the polysiloxane, and wherein R, R', and R" are each selected from the group consisting of a hydrogen atom, an acyl group, an allyl group, an acryloyl group, and a propanethiol group.

15. The article of manufacture of claim 13, wherein the dimerizable hydroxycinnamic acid-derived crosslinkers have the following structure:

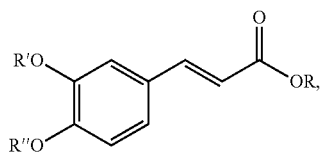

where —OR, —OR', and —OR" are substituents that can participate in crosslinking reactions with the polysiloxane, and wherein R, R', and R" are each selected from the group consisting of a hydrogen atom, an acyl group, an allyl group, an acryloyl group, and a propanethiol group.

16. The article of manufacture of claim 13, wherein, upon dimerization of the dimerizable hydroxycinnamic acid-derived crosslinkers, the crosslinked polymer has the following structure:

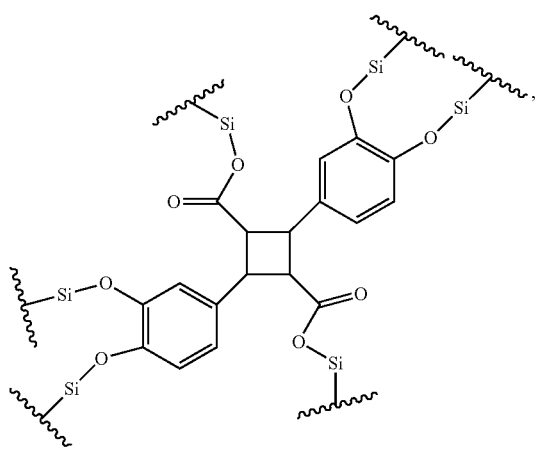

wherein the wavy lines represent binding sites on the polysiloxane.

* * * * *